United States Patent
Chang

Patent Number: 5,901,269
Date of Patent: May 4, 1999

[54] SPEED REGULATING CIRCUIT FOR MOTOR OF POWER COPING SAW

[76] Inventor: Chin-Chin Chang, No.122, Lane 967, San Feng Road, Feng Yuan, Taichung Hsien, Taiwan

[21] Appl. No.: 08/847,216

[22] Filed: May 1, 1997

[51] Int. Cl.⁶ .................................................. H02K 7/065
[52] U.S. Cl. .......................... 388/832; 318/17; 318/257; 318/490; 322/40; 83/72
[58] Field of Search .................................. 318/430–460, 318/17, 490, 257; 388/832, 811, 817, 907.5, 930, 904, 916, 838, 937, 819, 39; 83/72, 403.1, 411.3, 412, 733; 322/40; 73/153, 660; 51/165.71

[56] References Cited

U.S. PATENT DOCUMENTS

| | | | |
|---|---|---|---|
| 3,789,279 | 1/1974 | Dempsey et al. | 318/39 |
| 3,818,299 | 6/1974 | Paule et al. | 318/353 |
| 3,947,737 | 3/1976 | Kimura et al. | 317/257 |
| 4,266,276 | 5/1981 | Hayashi et al. | 364/475 |
| 4,468,597 | 8/1984 | Baumard et al. | 318/317 |
| 4,829,218 | 5/1989 | Bauer | 388/811 |
| 4,910,447 | 3/1990 | Masters | 318/599 |
| 4,911,002 | 3/1990 | Enderlin et al. | 73/153 |
| 4,942,795 | 7/1990 | Linke et al. | 83/72 |
| 4,999,556 | 3/1991 | Masters | 318/599 |
| 5,637,971 | 6/1997 | Pratt | 328/599 |
| 5,637,973 | 6/1997 | Hirai et al. | 318/640 |
| 5,684,388 | 11/1997 | Theising et al. | 322/40 |

*Primary Examiner*—Paul Ip
*Attorney, Agent, or Firm*—Bacon & Thomas, PLLC

[57] ABSTRACT

A speed regulating circuit for a motor of a power coping saw includes a DC voltage circuit, a manual speed regulating circuit, a feedback controlling circuit and a motor driving circuit. The DC voltage circuit includes a diode, a resistor, a capacitor, and a Zener diode. The manual controlling circuit includes a Zener diode and a resistance. The feedback controlling circuit includes an amplifier, a transistor, a pulse transformer. The motor driving circuit includes an SCR and a diode. The manual controlling circuit may first be set with a reference voltage signal corresponding to the intended rotational speed of the motor. The reference voltage signal is sent to the feedback controlling circuit to get a rotational speed controlling signal of a motor with respect to the variation of loads. A DC current is then supplied to the motor driving circuit for constantly rotating the DC motor despite the variation of the load.

5 Claims, 3 Drawing Sheets

5,901,269

SPEED REGULATING CIRCUIT FOR MOTOR OF POWER COPING SAW

FIELD OF THE INVENTION

The present invention relates to a speed regulating circuit, more particularly, to a speed regulating circuit for motor of a power coping saw. The regulating circuit comprises a DC voltage circuit, a manual speed regulating circuit, a feedback controlling circuit and a motor driving circuit. The controlling principle is based on the load variation detected by the feedback controlling circuit, then the detected variation is processed and then the controlling signal for motor speed is therefore adjusted. Then a negative feedback circuit is established and the motor of sawing machine is set in a constant speed. The cutting performance is therefore increased.

DESCRIPTION OF PRIOR ART

In the conventional power coping saw, a DC motor is installed therein for driving the blade of the coping saw and the workpiece can therefore be cut. However, when the workpiece is moved to engage with the blade for cutting, the workpiece will also exert a reaction to the blade of the coping saw. This resulted reaction will in turn be transformed into a load to the driving motor, consequently, the rotating speed is lowered down as the load increased. In the very beginning, when the workpiece is firstly moved to engage with the blade of coping saw, the load exerted to the motor is drastically increased such that the speed of the motor is lowered immediately. As a result, the cutting work to be applied on the workpiece can not be kept on smoothly and the cutting quality is negatively influenced.

On the other hand, there is a commercial available motor having a manual regulating controller. The speed of the motor is adjusted by a rheostat to be manipulated manually. Even the motor can be readily adjusted via the rheostat, however, when the workpiece is moved to engage with the blade of the motor, the speed of motor is still lowered down as the load is drastically increased. In this case, the rheostat shall be adjusted again to overcome the lower down of the speed. In light of this, the speed of the motor shall be adjusted occasionally to overcome the decrease of speed resulted from the increasing of working load.

SUMMARY OF THE INVENTION

It is the objective of this invention to provide a speed regulating circuit for motor of power coping saw wherein the speed of motor can be kept in constant despite the variation of the load.

In order to achieve the object set forth, the speed regulating circuit for motor of a power coping saw comprises a DC voltage circuit, a manual speed regulating circuit, a feedback controlling circuit and a motor driving circuit. The DC voltage circuit includes a diode, a resistance, a capacitor, and a Zener diode. The manual controlling circuit includes a Zener diode, a resistance and a resistance. The feedback controlling circuit includes a amplifier, a transistor, and a pulse transformer. The motor driving circuit includes a SCR and a diode.

The reference voltage of the intended speed for the motor of coping saw is adjusted by the manual controlling circuit. Then, via the feedback controlling circuit, the motor driving controlling signal is attained and which is dependent to the load variation. Then a negative feedback circuit is established and the DC voltage for the motor driving circuit is supplied to drive the DC motor. In light of this, the speed of the motor of coping saw is kept constantly despite the variation of the load and the cutting performance is therefore increased.

BRIEF DESCRIPTION OF DRAWINGS

In order that the present invention may more readily be understood the following description is given, merely by way of example with reference to the accompanying drawings, in which.

DETAILED DESCRIPTION OF PREFERRED EMBODIMENT

Figure 1:
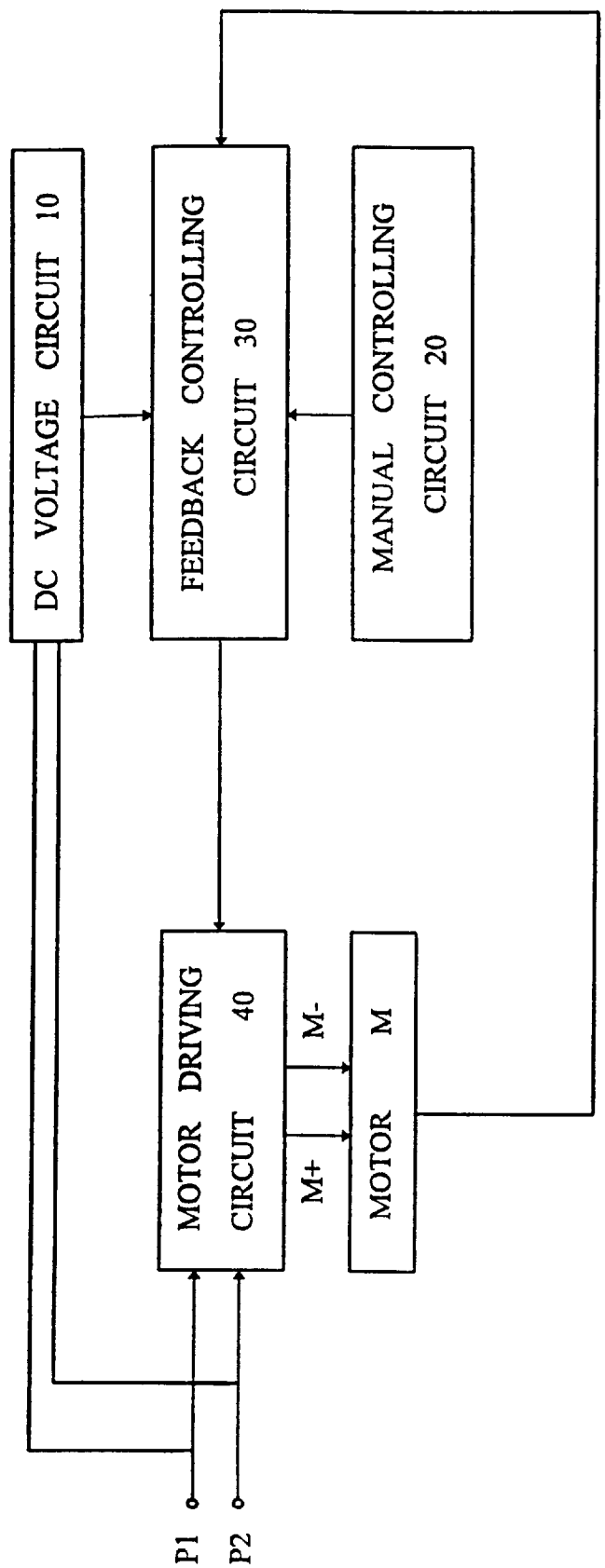
FIG. 1 is a block diagram of the regulating circuit for the power coping saw.
Figure 2:
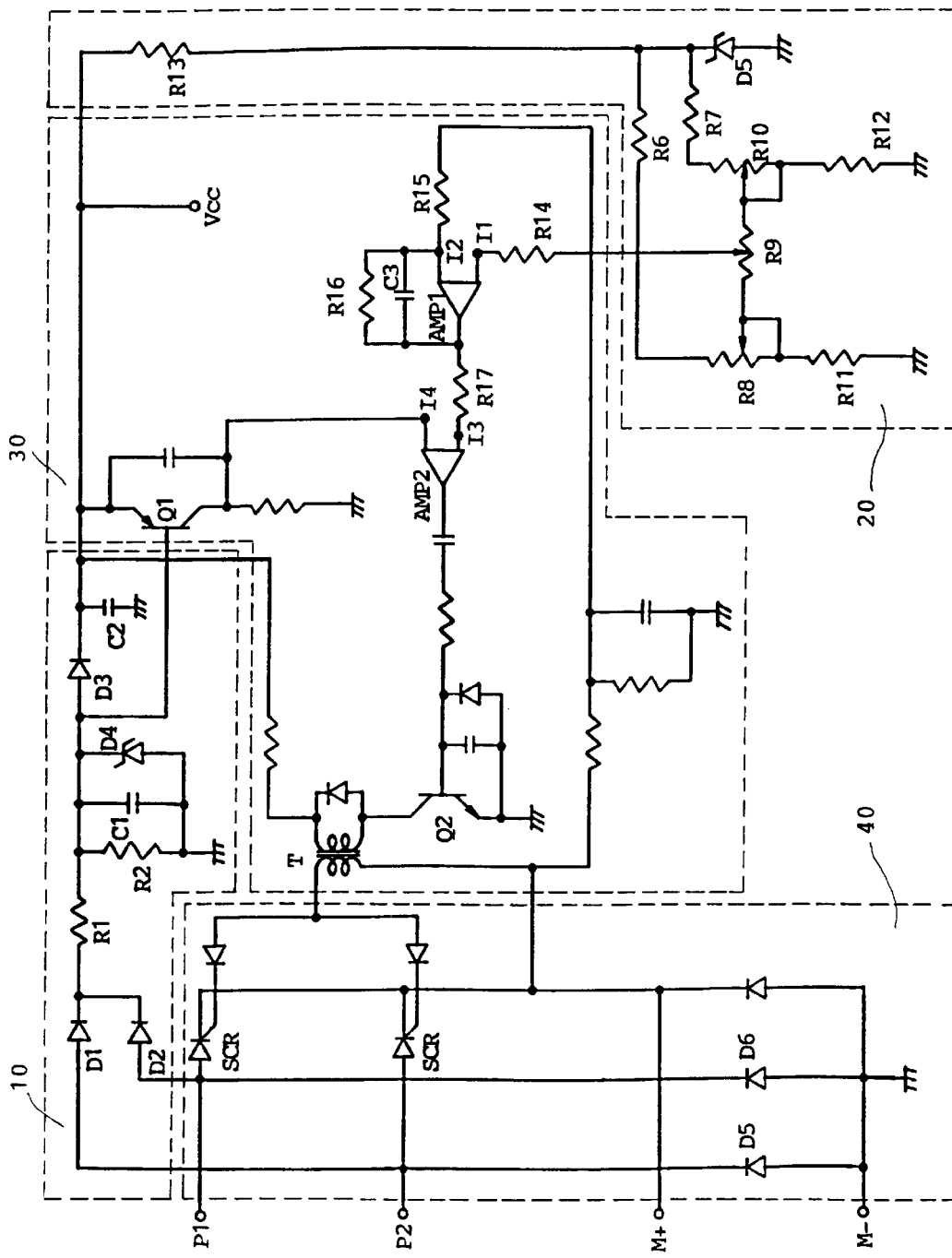
FIG. 2 is a circuitry of the regulating circuit shown in FIG. 1.
Figure 3:
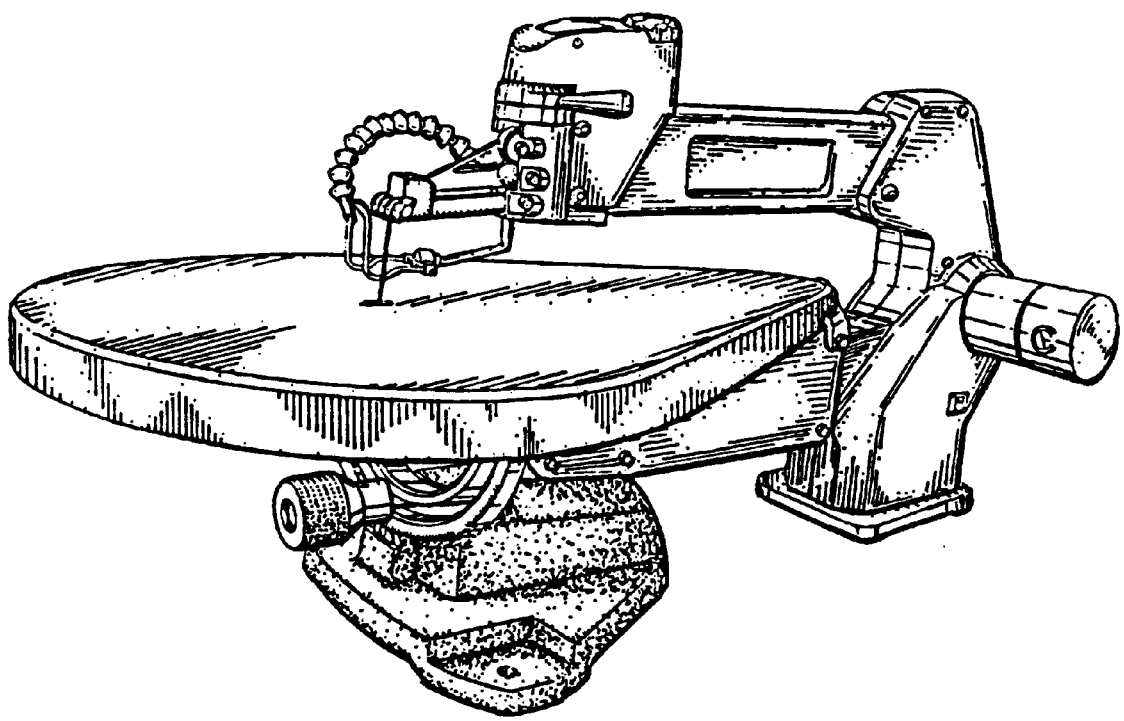
FIG. 3 is a perspective view of a power coping saw.

Referring to FIGS. 1 to 3, the speed regulating circuit of a power coping saw includes a DC voltage circuit 10, a manual controlling circuit 20, a feedback controlling circuit 30, and a motor driving circuit 40. And p1 and p2 will be used to represent the input ends of the AC voltage. M+ and M− will be used to represent the positive and negative of the DC voltage such that the motor M is driven in a constant speed.

The DC voltage circuit 10 will convert the AC voltage supply into a Vcc to the speed regulating circuit after the AC voltage is rectified and filtered. While the manual controlling circuit 20 may set a reference voltage signal previously for an intended rotation speed. This reference voltage signal will then be sent to the feedback controlling circuit 30 and which is further modulated via feedback controlling and finally a controlling signal for motor speed is attained. By this arrangement, the rotation of the motor will kept constantly despite the variation of the load. That means, the motor driving circuit 40 receives the speed controlling signal from the feedback controlling circuit 30 and then output a suitable DC voltage to drive the DC motor which is in turn rotated in constant speed. The reference voltage signal set via the manual controlling circuit 20 is firstly compared by the feedback controlling circuit 30, then a speed controlling signal corresponding to the variation of load is achieved, then a DC voltage for driving the motor is output from the motor driving circuit 40. Accordingly, the blade of the power coping saw will be driven in a constant speed via the DC motor despite the variation of load.

As shown in FIG. 2, the DC voltage circuit 10 includes a plurality of diodes (D1, D2, D3, D5 and D6), a plurality of resistance (R1, R2), a plurality of capacitors (C1, C2) and a Zener diode (D4). Via the circuit 10, the AC voltage is firstly converted by the diodes (D1, D2, D5 and D6) into the DC voltage, then via the resistance R1 and R2, and capacitor C1 for filtering, then it is further processed by the diode D3 to get a voltage level of DC voltage.

The main function of the manual controlling circuit 20 is the reference voltage signal corresponding to an intended rotational speed of motor can be previously set via this manual controlling circuit 20. This reference voltage signal can be set by the rheostat R8, R9 and R10. Resistance R6, R7, R11, R12 and R13 is branch resistance and the Zener diode D5 is used to set the reference level of the manual speed controlling circuit 20.

The feedback controlling circuit 30 includes two amplifier AMP1 and AMP2, two transistors Q1 and Q2, a pulse transformer T and pertinent electronic components. The main purpose of this circuit 30 is to get a speed controlling voltage corresponding to the variation of load. When the reference voltage signal corresponding to the intended rotational speed from the manual controlling circuit 20 is input to the input terminal I1 of the AMP1. On the other hand, the input terminal I2 of the AMP1 receives the feedback signal from the feedback controlling circuit 30. A differential amplifier is comprised by the amplifier AMP1, pertinent capacitor C3, and resistance R14–R16. Accordingly, the reference voltage signal and the feedback signal is differentially amplified by the AMP1 firstly and then are input to the input terminal I3 of the AMP2. On the other hand, a zigzag-shape voltage is input to the input terminal I4 of the AMP2. The AMP2 constitutes a comparator with pertinent components. In light of this, the signals input from the input terminals I3, I4 are compared by the AMP2 is sent to drive the transistor Q2 to pass. Besides, a triggering pulse for the silicon controlling rectifier (SCR) is generated by the pulse transformer T. The counter potential from the motor is also sent to the input terminal I2 of the AMP2. According to the feedback circuit, the triggering pulse for the silicon controlling rectifier (SCR) generated by the pulse transformer T will be advanced if the load of DC motor increased. Accordingly, the triggering of the pass angle of the silicon controlling rectifier (SCR) of motor driving circuit 40 is advanced. In light of this, the lowered speed of the motor resulted from increasing load is compensated, i.e. the DC motor can be kept rotating in a constant speed even the working load increases.

Similarly, when the working load decreases, the triggering of the pass angle of the silicon controlling rectifier (SCR) of motor driving circuit 40 is delayed such the increased speed of the motor resulted from decreasing load is also compensated, i.e. the DC motor can be kept rotating in a constant speed even the working load decreases.

From the forgoing description, it can be readily appreciated that once the rotational speed of the motor is set by the manual controlling circuit 20, the rotational speed of the motor is kept constantly despite the variation of the loads, i.e. increasing or decreasing.

The motor driving circuit 40 is composed by five silicon controlling rectifiers (SCR) and five diodes. The motor driving circuit 40 provides the power required by the DC motor. On the other hand, p1 and p2 represent the AC input terminals, that is, different AC voltage 110V or 220V can be readily connected. M+ and M– represent the positive and negative terminals of he motor.

From the forgoing description, it can be readily appreciated that by the provision of the present invention, the rotational speed of the DC motor of the power coping saw can be kept constantly despite to the variation of the loads, accordingly, the cutting process can be readily and efficiently performed.

I claim:

1. A seed regulating circuit for a motor of a power coping saw, said speed regulating circuit comprising in combination:
    a) a motor driving circuit coupled to the motor for driving the motor,
    b) a feedback controlling circuit for receiving a counter potential from the motor, said feedback controlling circuit being coupled to said motor driving circuit;
    c) a DC voltage circuit coupled to said feedback controlling circuit for energizing said feedback controlling circuit,
    d) a manual speed regulating circuit coupled to said feedback controlling circuit for generating a reference voltage signal, said reference voltage signal being set corresponding to an intended rotational speed of the motor via said manual speed regulating circuit, where
    said feedback controlling circuit generates a feedback signal corresponding to the counter potential received from the motor,
    said feedback controlling circuit compares said reference voltage signal from said manual speed regulating circuit and said feedback signal and generates a controlling signal and supplies said controlling signal to said motor driving circuit for compensating different loads of the motor and for driving the motor in constant rotational speed.

2. The speed regulating circuit according to claim 1, wherein said DC voltage circuit includes a plurality of diodes for converting an AC voltage into a DC voltage, and includes means for filtering said DC voltage.

3. The speed regulating circuit according to claim 1, wherein said manual speed regulating circuit includes at least one rheostat for obtaining said reference voltage signal.

4. The speed regulating circuit according to claim 1, wherein said feedback controlling circuit includes a first amplifier having a first input terminal coupled to said manual speed regulating circuit for receiving said reference voltage signal from said motor driving circuit, and for allowing said feedback controlling circuit to compare said reference voltage signal and said feedback signal and for allowing said feedback controlling circuit to generate said controlling signal.

5. The speed regulating circuit according to claim 4, wherein said feedback controlling circuit includes means for generating a zigzag-shape voltage, and includes a second amplifier having a first input terminal coupled to said first amplifier for receiving and for ampliplifing a signal from said first amplifier and having a second input terminal, said zigzag-shape voltage is supplied into said second input terminal of said second amplifier, and said second amplifier compares and amplifies said zigzag-shape voltage and said signal from said first amplifier for generating said controlling signal.

* * * * *